Nov. 6, 1945.   J. W. MYERS   2,388,641
TOASTER
Filed Feb. 19, 1941   4 Sheets-Sheet 1

Inventor:
Joseph W. Myers
by his Attorneys,
Howson & Howson

Nov. 6, 1945.    J. W. MYERS    2,388,641
TOASTER
Filed Feb. 19, 1941    4 Sheets-Sheet 2
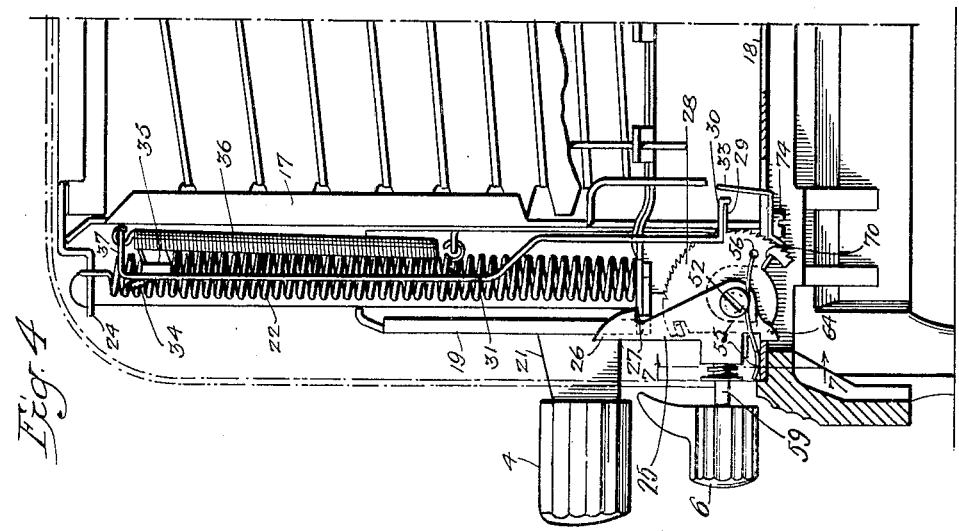
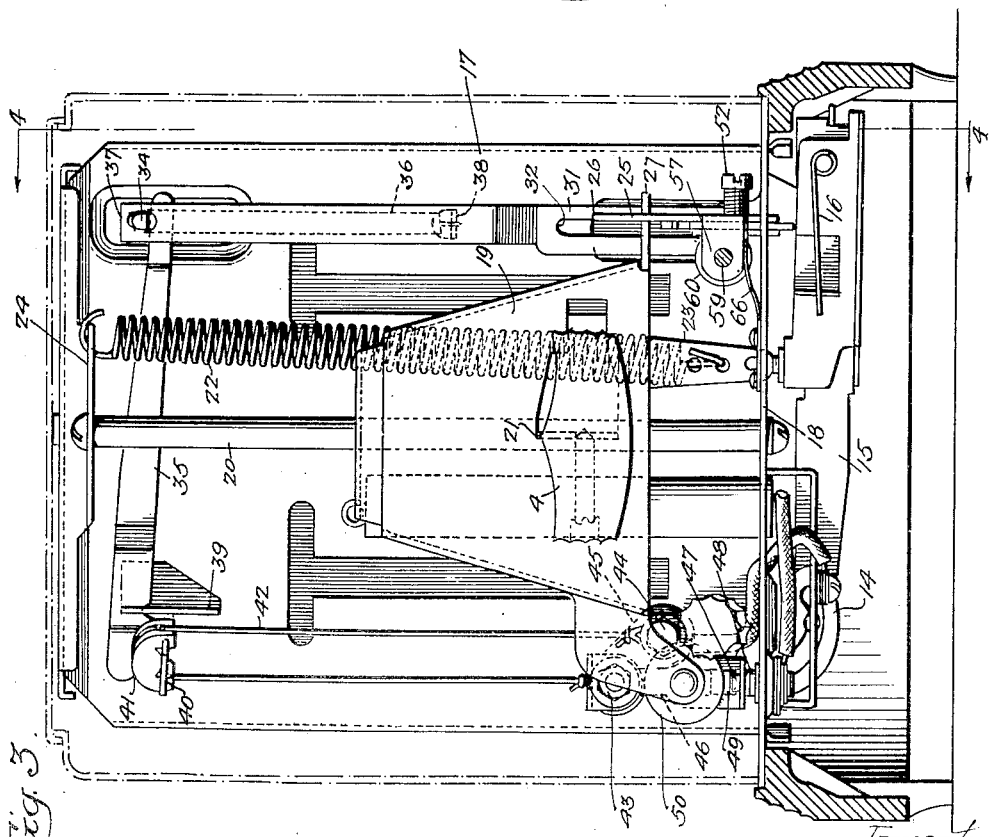
Inventor
Joseph W. Myers
By his Attorneys
Howson & Howson Nov. 6, 1945. J. W. MYERS 2,388,641
TOASTER
Filed Feb. 19, 1941 4 Sheets-Sheet 3

Inventor
Joseph W. Myers
by his Attorneys
Howson & Howson

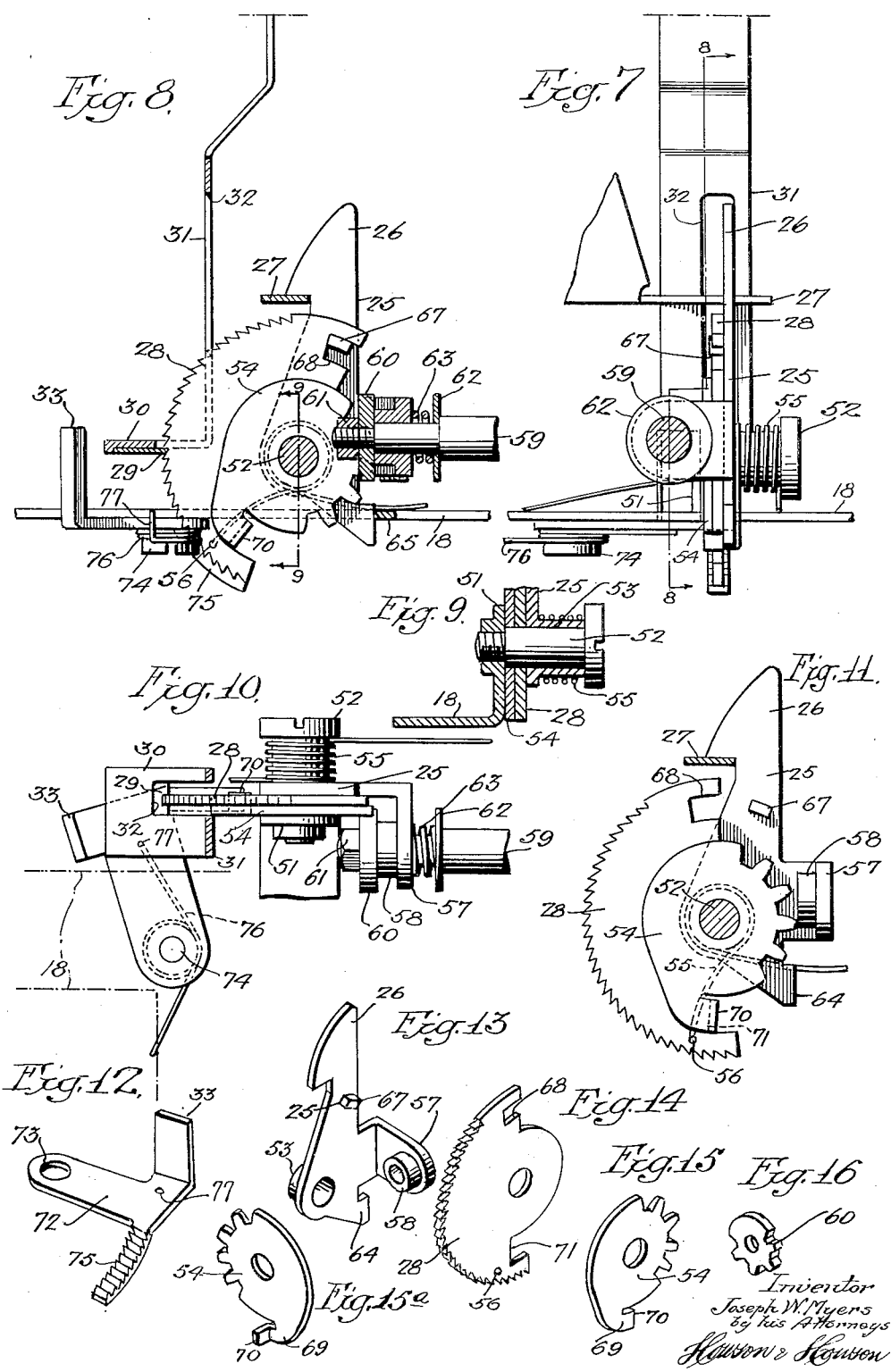

Patented Nov. 6, 1945

2,388,641

UNITED STATES PATENT OFFICE 2,388,641

TOASTER

Joseph W. Myers, Philadelphia, Pa., assignor to Proctor & Schwartz, Inc., Philadelphia, Pa., a corporation of Pennsylvania Application February 19, 1941, Serial No. 379,706

16 Claims. (Cl. 99—329)

This invention relates to a novel method and apparatus for the toasting of bread slices to any desired color and to any desired degree of crispness.

It has heretofore been the practice to toast bread slices by subjecting them to continuous heating until the surfaces have reached a desired color. Prior automatic toasters have employed a single manually adjustable control by means of which the operator may effect toasting of the bread to a desired color such as light, medium or dark. This adjustable control functions to control the toasting interval, usually through the medium of a thermostatic switch adjusted by the said control. In most modern toasters, the current is cut off and the toasted bread is discharged by a "pop-up" action at the end of the toasting period.

In automatic toasters of this type, it has been impossible to control the crispness or texture of the toasted bread to obtain varying degrees of crispness for any particular color. Where crisp dry toast has been desired, as by invalids, it has been necessary to make such toast in an oven wherein the bread is subjected to a moderate heat for a considerable time, rather than by the usual toasting method in an automatic toaster wherein the bread is subject to a rather intense searing heat for a short time. It should be noted that the crispness of a piece of toast depends upon the length of time it has been subjected to heat sufficient in temperature to drive out the water vapor.

The principal object of the present invention is to provide a novel automatic toaster which enables the user to obtain toast of any desired color and any desired degree of crispness. By means of this novel toaster, it is possible to obtain toast of any desired color varying from extreme light to extreme dark, and having any desired degree of crispness varying from a very soft interior to a very crisp interior. For example, it is possible to obtain light toast which is very crisp, whereas in the use of prior toasters a light color of the toast is necessarily accompanied by a very soft interior.

Another object of the invention is to provide a novel toaster and toasting method by means of which the toasting operation is divided into two parts which may be classified respectively as the "browning" operation or cycle and the "dehydrating or crisping" cycle. During the browning cycle, heat is applied to the bread surfaces at a predetermined rate until they attain substantially the desired color, and during the crisping cycle, less heat is applied to the bread for a predetermined time and in sufficient quantity to impart the desired degree of crispness to the bread without substantially varying its surface color.

A further object of the invention is to provide a novel toaster having two separate controls for controlling respectively the color of the toast and the degree of crispness thereof, and enabling the user to select beforehand any desired color and any desired degree of crispness.

A still further object of the invention is to provide an automatic toaster of this character in which the toasting operation is completely automatic from the time that the controls are adjusted until the completion of the crisping cycle, at which time the toast is automatically ejected.

Other objects and features of the invention will appear hereinafter.

In the accompanying drawings:

Fig. 3 is an end view of the toaster with the cover shown in dotted outline and with the parts in operative position;

Fig. 4 is a fragmentary sectional view taken along line 4—4 of Fig. 3;

Fig. 7 is an enlarged fragmentary sectional view taken along line 7—7 of Fig. 4 and illustrating the crispness control mechanism;

Fig. 8 is a fragmentary sectional view taken along line 8—8 of Fig. 7;

Fig. 9 is a detail sectional view taken along line 9—9 of Fig. 8;

Fig. 10 is a fragmentary plan view of the crispness control mechanism;

Fig. 11 is a detail sectional view similar to Fig. 8 but showing the parts in different positions; and Figs. 12 to 16 are perspective views of various parts of the crispness control mechanism.

Figure 1:
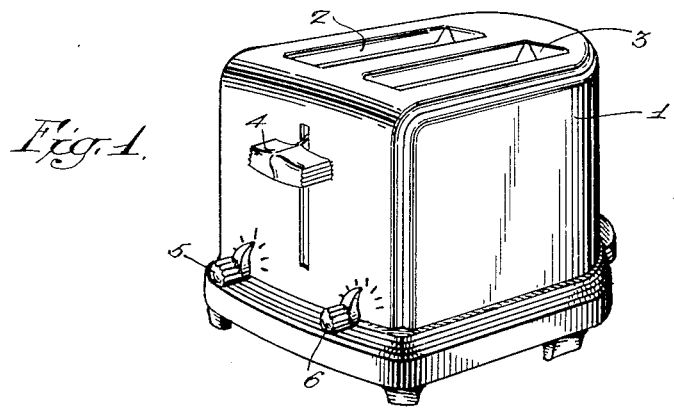
Fig. 1 is a perspective view of a toaster embodying the invention.

Referring first to Fig. 1, there is shown a toaster of the two-well type designated generally by reference character 1, the bread wells being shown at 2 and 3. The controls extend from an end of the device as illustrated. At 4, there is shown a depressible knob by means of which the bread carriage is moved to its toasting position to initiate the toasting operation. At 5, there is shown a manually rotatable color control knob by means of which the user is enabled to select the desired color of the toast. At 6, there is shown a control knob by means of which the user is enabled to select the desired degree of crispness of the toast, and to release the bread carriage to deliver the toast at any time desired, by a down-pressure on this knob. The two knobs 5 and 6 constitute the two controls above mentioned and serve to adjust certain operating parts of the toaster, as described hereinafter, to effect toasting of the bread to the desired color and the desired degree of crispness.

Figure 2:
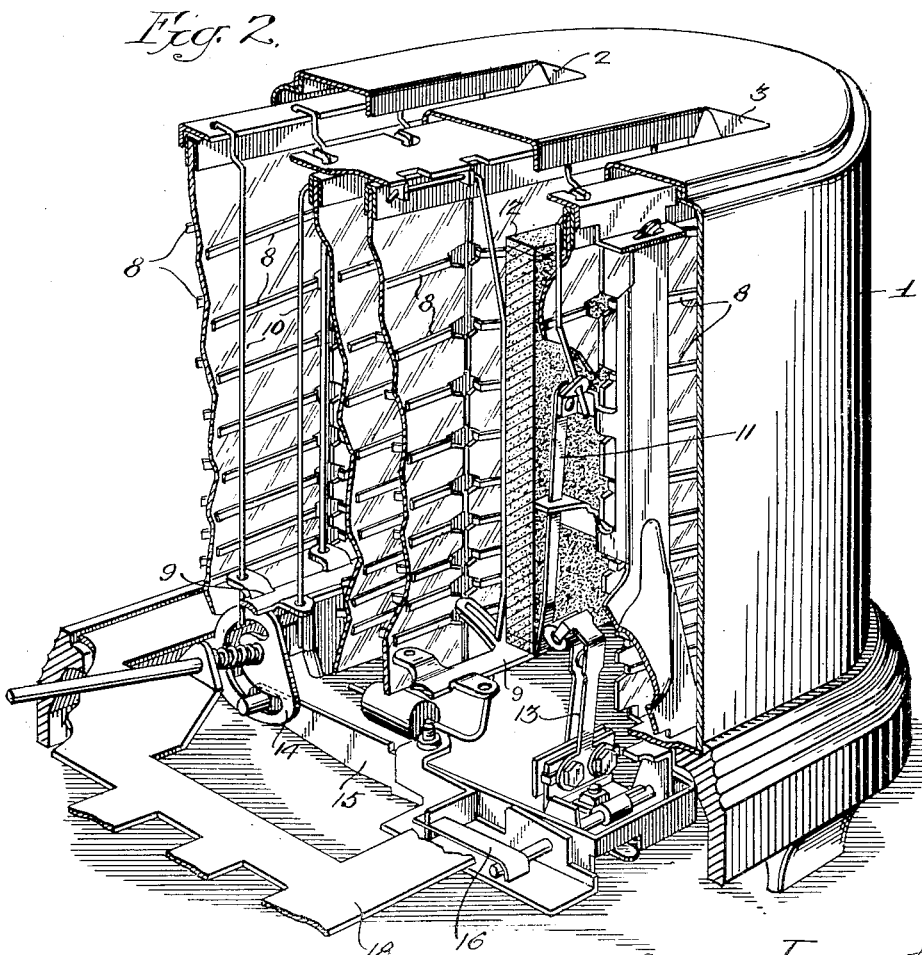
Fig. 2 is a sectional perspective view showing the thermostatic control mechanism.

Referring now to Fig. 2, the general construction of the toaster and the thermostatic control mechanism thereof, is preferably similar to that disclosed and claimed in the Myers and Stevenson Patent No. 2,179,422, granted November 7, 1939. For the purposes of the present invention, it will be unnecessary to describe this structure in great detail. The heating elements are shown generally at 8. The bread carriage is shown at 9, and comprises elements slidably mounted with reference to the vertical rods 10. The thermostatic element is shown at 11, and is adapted to engage a bread slice, represented at 12, and the thermostatically-controlled switch is shown at 13. This switch is adjustable by means of the knob 5, which is operable through the slotted cam 14 and arm 15 to adjust the switch 13 relative to the thermostatic element 11. This thermostatic control mechanism also includes a compensating thermostatic element 16. A detailed description of this mechanism is set forth in the above-mentioned patent.

Figure 5:
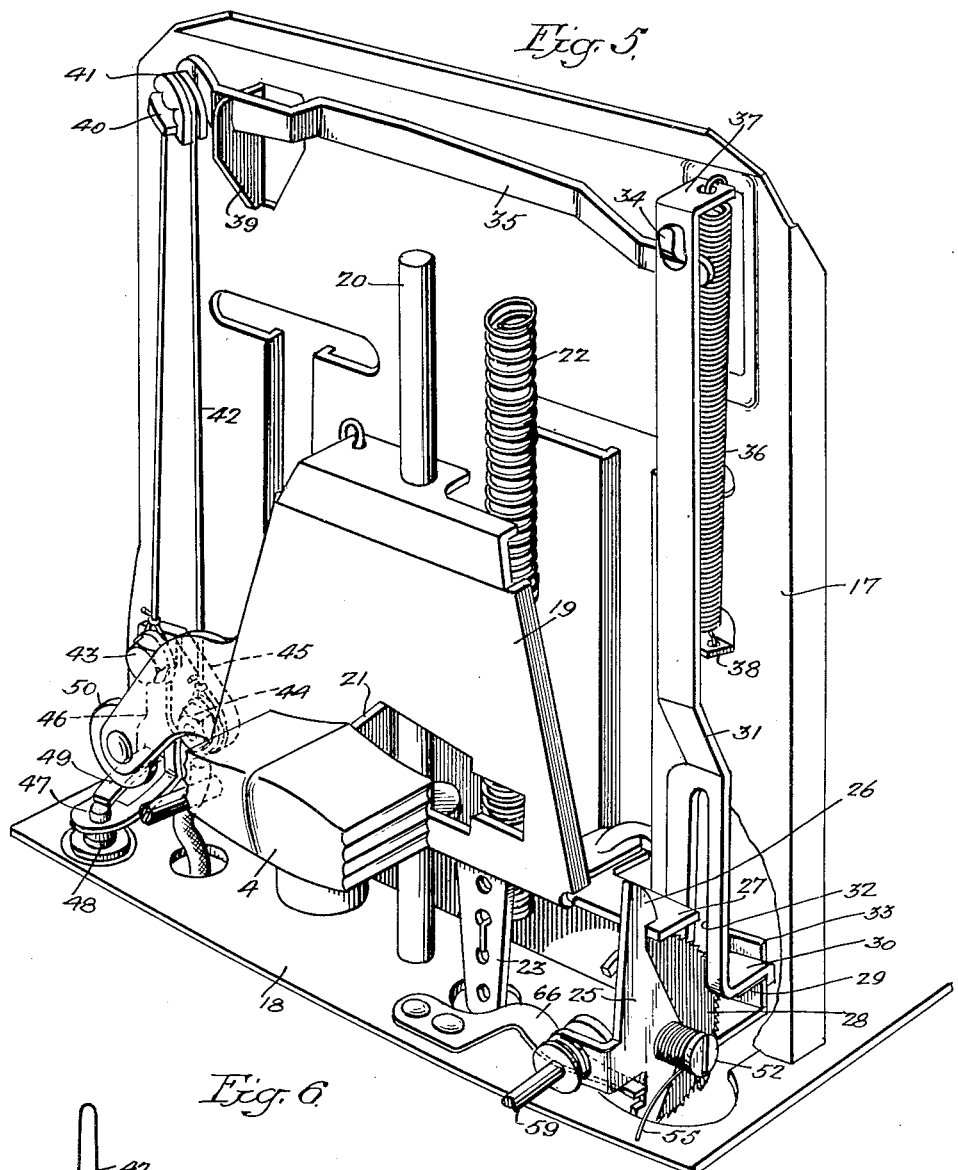
Fig. 5 is a perspective view illustrating more clearly the novel mechanism of the invention.

Referring now to Figs. 3 to 5, and particularly to Fig. 5, the framework of the toaster includes an end plate 17 and a base plate 18, with which the mechanism now to be described is associated. The bread carriage includes, as a part thereof, a plate 19 which is slidable along a vertical support and guide post 20. The knob 4, previously mentioned, is carried by an extension 21 turned out from the body of plate 19. A spring 22 has its lower end secured to extension 23 on plate 19, while the upper end of the spring is anchored to the top plate 24 of the framework. This spring urges the bread carriage upward to its discharge position. By means of the knob 4, the carriage may be moved downward against the action of spring 22 to its toasting position. The carriage is held in its toasting position by means of a pivoted latch 25, the hooked end 26 of which is adapted to engage a cooperating latch member 27 extending from the plate 19.

The latch 25 is operated by a ratchet member 28 which is adjustable by means of knob 6 to obtain different degrees of crispness in the toast, as described further hereinafter. The ratchet member is actuated by a pawl member 29 (see Fig. 8) carried at the lower end 30 of a vertical bar 31. The bar 31 is slotted at 32 to accommodate the ratchet member 28. The turned end 30 of bar 31 is adapted to engage an extension 33 on ratchet locking member 72 (see Fig. 12) for a purpose which will be explained later.

The bar 31 is provided with an aperture near its upper end and is suspended on a hook 34 on the end of a transverse lever 35. A spring 36 has its upper end secured to the upper turned end 37 of bar 31, while the lower end of this spring is anchored to a turned out lug 38 on plate 17. Thus the spring 36 tends to urge the bar 31 downward, and by virtue of its arrangement, the spring also tends to rock the bar 31 slightly outward about its pivotal mounting point at 34. This action of the spring tends to bring the pawl 29 into engagement with the ratchet teeth when the bread carriage is in its raised inoperative position, the extension 27 bears against the upper portion of bar 31 and maintains the pawl 29 and ratchet locking member 72 out of engagement with the ratchet teeth. However, when the bread carriage is moved downward to its toasting position, the bar 31 is released by virtue of the lower portion thereof being offset and free of engagement with the extension 27.

The action of bar 31 is controlled by the lever 35, which is mounted for slight pivotal movement on an extending ear 39 on the plate 17. To this end, the lever 35 is seated in a slot in the ear 39. Adjacent its mounting point, and at its end, the lever 35 has a lateral extension 40, upon which there is mounted an insulating saddle 41. A wire-like element 42 is looped about the saddle 41 and seats in a groove therein, and the ends of this element are secured to stationary terminals 43 and 44 mounted on an insulating block 45 on the plate 17. The terminal 43 also has secured thereto a resilient contact member 46 whose forwardly extending end 47 constitutes one element of a switch. To this end the portion 47 carries a contact which is adapted to engage an associated stationary contact 48 mounted on the base plate 18 and insulated therefrom. A finger 49 is turned out from the contact member 46, and is engageable by an insulating disc 50 carried by the carriage plate 19. Normally, the disc 50 is out of engagement with the switch, and the resilience of the contact member 46 maintains the switch contacts in open position. When the carriage is lowered, however, the disc 50 engages the finger 49 and presses it downward, and this action brings the upper switch contact into engagement with the lower switch contact with a wiping action. This insures good electrical contact between the switch elements.

The wire element 42 is current-conductive and is of such character that it heats and expands rapidly when current is passed through it, and it cools and contracts very rapidly when the current is interrupted. Preferably, this element is formed of resistance wire known commercially as grade #C wire, which is composed of 60% nickel, 16% chrome and 24% iron. Of course, any other suitable material may be used.

Figure 6:
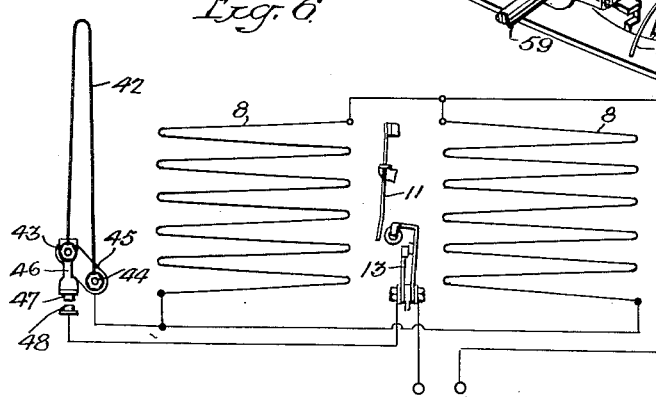
Fig. 6 is a diagrammatic illustration of the electrical circuit.

As may be seen in Fig. 6, the thermostatic switch 13, the switch 47—48 and the element 42 are serially connected in the toaster circuit along with the heating elements 8. In operation, the switch 47—48 is maintained closed as long as the bread carriage is latched in its toasting position. From Fig. 5, it may be seen that expansion of the element 42 will tend to permit the spring 36 to move the bar 31 downward, while contraction of the element 42 will tend to rock lever 35 counterclockwise and thus tend to raise the bar 31 against the action of spring 36. The cooperative action of thermostat 13, wire 42, beam 35 and member 31 to trip a toaster of this general type where the toast is finished is the subject matter of my application Serial No. 358,737, filed September 27, 1940.

Referring now to the crispness or texture control mechanism, this will be described with particular reference to Figs. 8 to 16 which illustrate the details of this mechanism. A vertically disposed support element 51 (see Fig. 9) extends upwardly from the base plate 18 and is carried thereby. The element 51 may be formed by turning up a portion of the sheet metal base plate 18. This support element 51 has a threaded aperture therein to receive the threaded end of a bearing pin 52. Thus, the pin 52 is fixedly carried by the support element 51 and extends laterally therefrom. The latch member 25 (see Fig. 13) has a sleeve portion 53 by which it is loosely mounted on the bearing pin 52. The ratchet member 28 (see Fig. 14) is also loosely mounted on bearing pin 52 adjacent the latch member 25. A segmental gear element 54 is likewise loosely mounted on pin 52 on the opposite side of the ratchet member 28. A helical spring 55 surrounds the sleeve portion 53 of the latch member 25 and one end of this spring engages the base plate 18, as shown in Figs. 4 and 5, while the other end of the spring extends into an opening 56 in the ratchet member 28. The arrangement is such that the spring 55 exerts a certain amount of pressure axially to maintain a certain degree of frictional engagement between the elements 25, 28 and 54, and the spring also exerts a rotary force on the ratchet member 28, tending to rotate this member clockwise, as viewed in Fig. 4, or counterclockwise, as viewed in Fig. 8.

The latch member 25 has a lateral extension 57 thereon (see Fig. 13), which carries a bearing sleeve or collar 58. A shaft 59 (see Fig. 8), one end of which is reduced in diameter, is rotatably supported by the bearing sleeve 58 and carries a segmental gear element 60 (see Fig. 16) secured thereon by means of a nut 61. A washer 62 and small spring 63 are provided to take up end play of the shaft 59, provide friction and to prevent rotation of 59 except when turned by the hand of the operator. The shaft 59 carries the knob 6, previously mentioned, by means of which the crispness control mechanism may be adjusted. As previously indicated, this mechanism is adjusted by rotation of knob 6 but, since latch member 25 is pivotally mounted on pin 52, it will be seen that the latch may be operated manually at any time by depressing knob 6, thus causing latch member 25 to free itself from the cooperating latch element 27 and permitting the bread carriage to rise. The fragmentary gear elements 54 and 60 are meshed with one another and the depression of knob 6 does not produce relative movement between them.

The gear element 54 has a projection 69 (see Fig. 15a) with a turned lug 70 arranged for engagement by the recessed edge 71 of ratchet member 28 (see Fig. 14). The lug 70 serves as a stop which is adjustable through gear elements 54 and 60 by the rotation of shaft 59, and which establishes the position of ratchet member 28 at the commencement of the toasting operation, as described further hereinafter.

The latch member 25 has formed thereon a stop 64 which is adapted to abut against a cooperating stop portion 65 on base plate 18, thus preventing counter-clockwise movement of latch member 25 from its vertical position, as viewed in Fig. 8, even though the latch element 27 may be disengaged from latch member 25. A leaf spring 66 (see Fig. 5) is secured to base plate 18 and urges the latch member 25 counter-clockwise, as viewed in Fig. 8, thus maintaining the latch member 25 in its vertical latching position. The latch member 25 carries a projecting lug 67 which is angularly aligned with a recess 68 of ratchet member 28. As will be seen later, the ratchet member trips the latch member through the engagement of these elements.

A ratchet locking member 72 (see Fig. 12) is pivotally mounted on base plate 18 by means of the aperture 73 in said member and the mounting screw 74 (see Fig. 8). This member has an arcuate toothed portion 75 which is adapted to engage ratchet member 28. A spring 76 is mounted on the pivot 74 and is arranged to urge the pivoted member 72 into engagement with ratchet member 28, the spring having one end anchored by engagement with base 18 and having its other end extending through an aperture 77 in member 72. The ratchet locking member has formed thereon the extension 33, previously referred to, which is engageable by the lower end 30 of bar 31 (see Figs. 4 and 5) to disengage member 72 from the ratchet member 28 whenever the bread carriage is in its raised position.

Considering the operation of the toaster as a whole and assuming that the bread carriage is in its inoperative or discharge position, the bread slices are placed in wells 2 and 3 and the control knobs 5 and 6 are adjusted to give the desired color and degree of crispness, respectively. In the inoperative condition of the toaster, the latch member 27 is in engagement with the upper part of arm 31 and the lower end 30 of the said arm is in engagement with the extension 33, so that the ratchet locking member 72 is held out of engagement with ratchet member 28, permitting the ratchet member 28 to be adjusted, if desired, by knob 6. The crispness control knob 6 is rotated clockwise for soft toast and counter-clockwise for crisp toast. As described above, the rotation of shaft 59 by means of knob 6 varies the position of lug 70, and since the spring 55 urges ratchet member 28 counter-clockwise, as viewed in Fig. 8, the ratchet member is adjusted accordingly. If the knob is rotated clockwise to its extreme position in that direction, the ratchet member 28 will be in the position of Fig. 8 so that the edge of recess 68 will be substantially in engagement with the lug 67 on the latch member 25. If knob 6 is rotated counter-clockwise to its extreme position in that direction, the ratchet member 28 will be rotated counter-clockwise, as viewed in Fig. 8, to a position such that the recess 68 is at a maximum distance from lug 67. For intermediate positions of the control knob 6, the ratchet member 28 will be adjusted so as to position the recess 68 at various distances from lug 67, as illustrated in Fig. 11. It might be well to mention that the spring 55 cannot cause any shifting of the elements, once the adjustment has been made, since the resistance to rotation of elements 54, 60, and 59 is too great.

Assume first that the crispness control knob 6 is adjusted for soft toast. The bread carriage is lowered by means of knob 4, thereby closing switch 47—48 to initiate the toasting operation as described above. At the same time, member 72 is permitted to engage the ratchet member 28. As the thermostat 11 responds to the surface temperature of the bread slice 12, its lower end moves away from the bread slice and eventually opens the thermostatically controlled switch 13. This period of operation constitutes the browning cycle during which heat is applied to the bread slices from the heating elements 8 continuously and at a high rate. The time duration of this browning cycle will depend, of course, upon the adjustment of switch 13 by means of the color control knob 5. During the browning cycle, current traverses the wire-like element 42 which expands as it is heated, thereby permitting spring 36 to exert a downward and outward force upon arm 31 as described above, bringing the pawl 29 into engagement with ratchet member 28. When the thermostatic switch 13 is opened by thermostatic element 11, the heating current is interrupted and the current flow through element 42 is likewise interrupted, causing the latter to cool and contract rapidly. Element 42 is thus caused to exert an upward pull on arm 31 through the medium of rocker arm 35, as previously described, and since the pawl 29 is in engagement with ratchet member 28, the ratchet member is caused to rotate clockwise, as viewed in Fig. 8, or counter-clockwise, as viewed in Figs. 4 and 5. It will be noted that this movement is permitted by member 72 which acts to prevent return motion of ratchet member 28.

Since knob 6 has been assumed to be adjusted for very soft toast and the parts were in the position of Fig. 8, the rotation of ratchet member 28 will be effective at once to move latch member 25 through the medium of lug 67. The latch member 25 is thus tripped, releasing the bread carriage and causing switch 47—48 to open, thereby terminating the toasting operation without any appreciable crisping. The movement of ratchet member 28 does not change the position of the sectional gear element 54 and associated adjustment elements since the frictional engagement between elements 28 and 54 is not sufficient to overcome the force required to move shaft 59 through the gear elements.

For other adjustments of the crispness control knob 6, the crisping cycle will come into play. Assume for example that knob 6 is rotated counter-clockwise sufficiently to move the ratchet member 28 to the position shown in Fig. 11. The toasting operation will be initiated as before and the browning cycle will take place as described above. At the end of this cycle, the ratchet member 28 will be moved or notched a small amount by the notching action of pawl 29 when element 42 contracts. The small rotary movement of ratchet 28 in a clockwise direction, as viewed in Fig. 11, will bring the recess 68 closer to lug 67. The heated thermostatic element 11 will cool slightly and its lower end will recede sufficiently to permit closure of switch 13. The toaster is again energized and the element 42 is rapidly heated and expanded to again move the pawl 29 to an effective position in engagement with ratchet member 28 while the latter is held against return action of spring 55 by teeth 75 on pawl member 72. After a very short interval, the lower end of thermostatic element 11 will move to open switch 13, thereby interrupting the circuit and causing element 42 to cool and contract very rapidly, which imparts a second notching movement to ratchet member 28 and bringing the recess 68 further toward lug 67. This operation is repeated, the thermostatic switch 13 being intermittently closed for short intervals. The quantity of heat which is supplied in increments to the bread slices is sufficient to dehydrate the bread and increase the degree of crispness without appreciably varying the color imparted by the previous browning cycle. When the ratchet member 28 has been notched sufficiently to effect tripping of the latch member 25, the bread carriage is released, terminating the toasting operation.

Thus, it will be seen that the toasting operation according to the method and apparatus of the present invention comprises a browning cycle whose duration is variable by means of the color control knob 5 and during which heat is supplied continuously to the bread at a relatively high rate, and a dehydrating or crisping cycle whose duration may be varied by means of the crispness control knob 6 and during which heat is supplied to the bread in sufficient quantity to impart the desired degree of crispness to the toast without appreciably varying the color thereof. In this manner, it is possible to obtain any desired color and any desired degree of crispness.

While the invention has been disclosed with reference to a specific form of apparatus, it will be apparent that various modifications and changes are possible without departing from the principles of the invention.

I claim:

1. In an automatic toaster, having a cooking cycle divided into two parts, means for cooking the bread at a relatively high rate during one of the said parts, means for cooking the bread at a relatively slow average rate during the other of said parts, manually adjustable means for controlling the amount of cooking in said first part, other manually adjustable means for controlling the amount of cooking in said second part, whereby adjustment of both of said manual means effects toasting of the bread a desired color and texture or crispness, and means for automatically terminating the toasting operation at the end of the complete toasting cycle.

2. In an automatic toaster, bread toasting means, means for initiating the toasting operation, means for operating said bread toasting means at a predetermined toasting rate until the surface of the bread reaches a predetermined temperature, and for thereafter operating said toasting means at a lower average toasting rate, means for adjusting the time interval during which said lower average toasting rate prevails, and means for automatically terminating said toasting operation at the expiration of said time interval.

3. In an automatic bread toaster, having a toasting cycle divided into two parts, bread toasting means, means for applying heat from said bread toasting means at a predetermined average rate during one part of said cycle, means for applying heat from said bread toasting means at a lower average rate during the other part of said cycle, manually operable means for adjusting the duration of said one part of said cycle, manually operable means for adjusting the duration of said other part of said cycle, and means for automatically terminating the toasting operation after completion of both parts of said cycle.

4. In an automatic toaster, means for initiating a toasting cycle, means for toasting a bread slice at a high average rate during the first part of the toasting cycle, thereby to effect coloring of the bread, manually-adjustable means for varying the duration of said first part of the toasting cycle to impart the desired color to the bread, means for toasting the bread slice at a lower average toasting rate during a second part of the toasting cycle, thereby to effect crisping of the bread, manually-adjustable means for varying the duration of said second part of the toasting cycle to impart the desired degree of crispness to the bread, and means for automatically terminating the toasting cycle when the bread has reached the desired degree of crispness as well as the desired color.

5. In an automatic bread toaster, an adjustable color control manual, an adjustable crispness control manual, means for applying heat to the bread at a relatively high average rate during a first time interval whose duration is determined by the setting of said first-named manual, means for applying heat to the bread at a lower average rate during a second time interval whose duration is determined by the setting of said last-named manual, and means for automatically terminating the toasting cycle at the expiration of the second time interval.

6. An automatic toaster adapted to toast a bread slice to a selected color and to a selected degree of crispness, comprising electrical heating means for applying heat to the bread slice, manually adjustable means for controlling the operation of said heating means so as to surface cook or sear the bread slice substantially to a desired color, additional manually adjustable means for effecting additional application of heat from said heating means to said bread slice for a period of time and in quantity sufficient to cause the bread slice to attain a desired degree of crispness without substantially varying the color of the bread slice, and means for automatically terminating the toasting operation when the bread has reached the desired degree of crispness as determined by the adjustment of said last-recited means.

7. A device for toasting a bread slice to a selected color and to a selected texture or degree of crispness, comprising electrical heating means, an adjustable color control manual, an adjustable crispness control manual, means controlled by said first-named manual for causing said heating means to apply heat to the surfaces of the bread slice at a predetermined rate and for a time sufficient to impart the desired color to the bread slice, means controlled by said last-named manual for causing said heating means to apply heat to the bread slice at a lower average rate and for a time sufficient to impart the desired degree of crispness to the bread slice without substantially changing its color, and means for automatically terminating the application of heat to the bread slice when it has reached the desired color and degree of crispness as determined by the adjustments of said control manuals.

8. A device for toasting a bread slice to a selected color and to a selected texture or degree of crispness, comprising electrical heating means, an adjustable color control manual, an adjustable crispness control manual, means controlled by said first-named manual for causing said heating means to apply heat to the surfaces of the bread slice at a predetermined rate and for a time sufficient to impart the desired color to the bread slice, means controlled by said last-named manual for causing said heating means to apply heat intermittently to the bread slice for a time sufficient to impart the desired degree of crispness to the bread slice without substantially changing its color, and means for automatically terminating the application of heat to the bread slice when it has reached the desired color and degree of crispness as determined by the adjustments of said control manuals.

9. A device for toasting a bread slice to a selected color and to a selected texture or degree of crispness, comprising electrical heating means, an adjustable color control manual, an adjustable crispness control manual, thermostatic switch means adjustable by said first-named manual and included in circuit with said heating means to control the energization thereof, whereby heat is applied continuously to the bread slice from said heating means until the bread reaches a desired color as determined by the setting of said first-named manual, and thereafter the thermostatic switch means operates intermittently to supply additional heat to the bread slice at a relatively low average rate, and means controlled by said last-named manual for automatically interrupting the intermittent application of heat to the bread slice when it reaches the desired degree of crispness as determined by the setting of said last-named manual.

10. A device for toasting a bread slice to a selected color and to a selected texture or degree of crispness, comprising electrical heating means, an adjustable color control manual, an adjustable crispness control manual, thermostatic switch means adjustable by said first-named manual and included in circuit with said heating means to control the energization thereof, whereby heat is applied continuously to the bread slice from said heating means until the bread reaches a desired color as determined by the setting of said first-named manual, and thereafter the thermostatic switch means operates intermittently to supply additional heat to the bread slice at a relatively low average rate, and means operable by said switch means and controlled by said last-named manual for automatically interrupting the intermittent application of heat to the bread slice when it reaches the desired degree of crispness as determined by the setting of said last-named manual.

11. An automatic toaster adapted to toast a bread slice to a selected color and to a selected degree of crispness, comprising electrical heating means for applying heat to the bread slice, means movable between two positions to initiate or interrupt the toasting operation, means urging said movable means toward its inoperative position, latch means for holding said movable means in its operative position, a latch-tripping member adapted for step-by-step movement to its operative position, thermostatically-controlled means for controlling the energization of said heating means and for actuating said latch-tripping member, manual means for varying the action of said last-named means, whereby to effect toasting of the bread slice to a desired color, and manual means for initially adjusting said latch-tripping member to prolong the toasting operation at a reduced average toasting rate under control of said thermostatically-controlled means and thereby impart the desired degree of crispness to the bread slice.

12. An automatic toaster adapted to toast a bread slice to a selected color and to a selected degree of crispness, comprising electrical heating means for applying heat to the bread slice, means movable between two positions to initiate or interrupt the toasting operation, means urging said movable means toward its inoperative position, latch means for holding said movable means in its operative position, a latch-tripping member adapted for step-by-step movement to its operative position, means for actuating said latch-tripping member, a thermomotive element arranged to be affected by the surface temperature of the bread slice, means operable by said element for controlling the energization of said heating means and for controlling said actuating means, manual means for varying the control exerted by said thermomotive element, whereby to effect toasting of the bread slice to a desired color, and manual means for initially adjusting said latch-tripping member to prolong the toasting operation at a reduced average toasting rate under control of said thermomotive element and thereby impart the desired degree of crispness to the bread slice.

13. An automatic toaster adapted to toast a bread slice to a selected color and to a selected degree of crispness, comprising electrical heating means for applying heat to the bread slice, means movable between two positions to initiate or interrupt the toasting operation, means urging said movable means toward its inoperative position, latch means for holding said movable means in its operative position, a thermal-responsive element in circuit with said heating means, said element being adapted to expand and contract when heated and cooled, a thermostatic switch in circuit with said element for controlling the heating and cooling of said element, a latch-tripping member adapted for step-by-step movement to its operative position and operable by said element, manual means for adjusting said thermostatic switch, whereby to effect toasting of the bread slice to a desired color, and manual means for initially adjusting said latch-tripping member to prolong the toasting operation at a reduced average toasting rate under control of said thermostatic switch and thereby impart the desired degree of crispness to the bread slice.

14. An automatic toaster adapted to toast a bread slice to a selected color and to a selected degree of crispness, comprising electrical heating means for applying heat to the bread slice, means movable between two positions to initiate or interrupt the toasting operation, means urging said movable means toward its inoperative position, latch means for holding said movable means in its operative position, a latch-tripping mechanism including a ratchet element adapted for step-by-step movement to its operative position, thermostatically-controlled means for controlling the energization of said heating means and for actuating said ratchet element, manual means for varying the action of said last-named means, whereby to effect toasting of the bread slice to a desired color, and manual means for initially adjusting said ratchet element to prolong the toasting operation at a reduced average toasting rate under control of said thermostatically-controlled means and thereby impart the desired degree of crispness to the bread slice.

15. In an automatic toaster, bread toasting means, a bread slice carrier movable between a bread toasting position and an ejecting position, means for latching said slice carrier in bread toasting position, a ratchet movable to trip the said latching means, means including a current heated thermomotive element in circuit with said bread toasting means for moving said ratchet through a portion of its travel upon each cessation of the flow of current therethrough, a thermostatic switch in series with said toasting means and said thermoresponsive element for opening the circuit thereof in response to the attainment of a predetermined temperature by the surface of the bread, means for adjusting said thermostatic switch, and manually operable means for adjusting the initial position of said ratchet.

16. In an automatic toaster, bread toasting means, means movable between two positions for initiating and terminating a toasting operation, means for latching said movable means in the bread toasting position, means movable through a predetermined distance for tripping said latching means, manually adjustable means for varying the distance of travel of said latch tripping means, current operated means for moving said latch tripping means through an increment of its travel in response to each cessation of the flow of current therethrough, means for simultaneously interrupting the current flow in said bread toasting means and said last-named means, and means for actuating said current interrupting means whenever the surface of the bread substantially reaches a predetermined temperature.

JOSEPH W. MYERS.